US008589253B2

(12) United States Patent
Rothman

(10) Patent No.: US 8,589,253 B2
(45) Date of Patent: Nov. 19, 2013

(54) SOFTWARE SYSTEM FOR DECENTRALIZING ECOMMERCE WITH SINGLE PAGE BUY

(75) Inventor: Simon Rothman, Palo Alto, CA (US)

(73) Assignee: Glyde Corporation, Palo Alto, CA (US)

( * ) Notice: Subject to any disclaimer, the term of this patent is extended or adjusted under 35 U.S.C. 154(b) by 0 days.

(21) Appl. No.: 13/555,294

(22) Filed: Jul. 23, 2012

(65) Prior Publication Data

US 2012/0290402 A1 Nov. 15, 2012

Related U.S. Application Data

(62) Division of application No. 11/963,711, filed on Dec. 21, 2007, now Pat. No. 8,244,590.

(51) Int. Cl.
*G06Q 30/00* (2012.01)
(52) U.S. Cl.
USPC .... 705/26.7; 705/27.2; 705/14.51; 705/26.41
(58) Field of Classification Search
USPC ........ 705/26.1, 27.1, 26.7, 27.2, 14.51, 26.41
See application file for complete search history.

(56) References Cited

U.S. PATENT DOCUMENTS

| | | | |
|---|---|---|---|
| 5,117,364 A | 5/1992 | Barns-Slavin et al. | |
| 5,664,115 A | 9/1997 | Fraser | |
| 5,948,061 A * | 9/1999 | Merriman et al. | 709/219 |
| 6,131,087 A | 10/2000 | Luke et al. | |
| 6,490,567 B1 | 12/2002 | Gregory | |
| 6,564,213 B1 | 5/2003 | Ortega et al. | |
| 6,598,027 B1 | 7/2003 | Breen et al. | |
| 6,714,922 B1 | 3/2004 | Sansone et al. | |
| 6,772,130 B1 | 8/2004 | Karbowski et al. | |
| 6,839,690 B1 | 1/2005 | Forth et al. | |
| 6,851,604 B2 | 2/2005 | Girotto et al. | |
| 7,111,252 B1 | 9/2006 | Harris | |
| 7,155,663 B2 | 12/2006 | Landsman et al. | |
| 7,197,475 B1 | 3/2007 | Lorenzen et al. | |
| 7,254,774 B2 | 8/2007 | Cucerran et al. | |
| 7,266,513 B2 | 9/2007 | Chalmers et al. | |
| 7,373,313 B1 | 5/2008 | Kahle et al. | |
| 7,418,410 B2 | 8/2008 | Caiafa | |
| 7,447,678 B2 | 11/2008 | Taylor et al. | |
| 7,497,369 B2 | 3/2009 | Dalzell et al. | |
| 7,580,863 B2 | 8/2009 | Broussand et al. | |
| 7,610,233 B1 | 10/2009 | Leong et al. | |
| 7,630,919 B1 | 12/2009 | Obrecht | |
| 7,711,604 B1 | 5/2010 | Walker et al. | |

(Continued)

OTHER PUBLICATIONS

Amazon.com, http://www.amazon.com/, Internet Archive (Nov. 7, 2007)—http://web.archive.org/web/20071107075225rn_1/www.amazon.com/, retrieved from the Internet on Mar. 25, 2011, 14 pages.

(Continued)

*Primary Examiner* — Courtney Stopp
(74) *Attorney, Agent, or Firm* — Kilpatrick Townsend & Stockton LLP

(57) ABSTRACT

A software system with a "single page buy" capability—both product information and purchase information on a single webpage. The software does the backend work needed to display both, in order to simplify the user experience. In one embodiment, commerce is "atomized" by pushing out the capability to purchase throughout the Internet—to ads on 3rd party sites, references in blogs, articles, etc. In one embodiment, a gliding product display is provided. The ad has a banner-type ad dimension, with product icons scrolling or gliding across it.

20 Claims, 5 Drawing Sheets

(56) References Cited

U.S. PATENT DOCUMENTS

| | | | |
|---|---|---|---|
| 7,743,059 B2* | 6/2010 | Chan et al. | 707/737 |
| 7,774,234 B1 | 8/2010 | Kopelman et al. | |
| 7,778,878 B2 | 8/2010 | Harding et al. | |
| 7,792,704 B2 | 9/2010 | Harding et al. | |
| 7,827,055 B1* | 11/2010 | Snodgrass et al. | 705/14.73 |
| 7,877,330 B2 | 1/2011 | Siegel et al. | |
| 8,244,590 B2 | 8/2012 | Rothman | |
| 2001/0032116 A1 | 10/2001 | Hyatt | |
| 2001/0034631 A1 | 10/2001 | Kiselik | |
| 2001/0037261 A1 | 11/2001 | Ishitsuka | |
| 2001/0054008 A1 | 12/2001 | Miller et al. | |
| 2002/0002527 A1 | 1/2002 | Holtzman | |
| 2002/0032668 A1 | 3/2002 | Kohler et al. | |
| 2002/0107820 A1 | 8/2002 | Huxter | |
| 2002/0107861 A1 | 8/2002 | Clendinning et al. | |
| 2002/0113815 A1 | 8/2002 | DeGross | |
| 2003/0020758 A1 | 1/2003 | Hinderks | |
| 2003/0023499 A1 | 1/2003 | Das et al. | |
| 2003/0023500 A1 | 1/2003 | Boies et al. | |
| 2003/0061147 A1 | 3/2003 | Fluhr et al. | |
| 2003/0065573 A1 | 4/2003 | Nagel et al. | |
| 2003/0105682 A1* | 6/2003 | Dicker et al. | 705/27 |
| 2003/0182222 A1 | 9/2003 | Rotman et al. | |
| 2003/0200156 A1* | 10/2003 | Roseman et al. | 705/27 |
| 2003/0204447 A1 | 10/2003 | Dalzell et al. | |
| 2003/0229552 A1 | 12/2003 | Lebaric et al. | |
| 2004/0088328 A1 | 5/2004 | Cook et al. | |
| 2004/0193436 A1 | 9/2004 | Stashluk et al. | |
| 2005/0004889 A1 | 1/2005 | Bailey et al. | |
| 2005/0071249 A1 | 3/2005 | Nix et al. | |
| 2005/0102202 A1 | 5/2005 | Linden et al. | |
| 2005/0144052 A1 | 6/2005 | Harding et al. | |
| 2005/0192893 A1 | 9/2005 | Keeling et al. | |
| 2005/0267774 A1 | 12/2005 | Merritt et al. | |
| 2006/0069616 A1 | 3/2006 | Bau | |
| 2006/0085272 A1 | 4/2006 | Case et al. | |
| 2006/0190379 A1 | 8/2006 | Maas et al. | |
| 2006/0212355 A1 | 9/2006 | Teague et al. | |
| 2006/0265259 A1 | 11/2006 | Diana et al. | |
| 2007/0022020 A1* | 1/2007 | Bernstein | 705/26 |
| 2007/0028185 A1 | 2/2007 | Bhogal et al. | |
| 2007/0083440 A1 | 4/2007 | Wirtz et al. | |
| 2007/0208635 A1 | 9/2007 | Van Luchene et al. | |
| 2007/0255644 A1 | 11/2007 | Elder | |
| 2008/0040323 A1 | 2/2008 | Joshi | |
| 2008/0109327 A1 | 5/2008 | Mayle et al. | |
| 2008/0114807 A1 | 5/2008 | Sembower | |
| 2008/0235042 A1 | 9/2008 | Boyd et al. | |
| 2008/0288368 A1 | 11/2008 | Marks et al. | |
| 2009/0064056 A1 | 3/2009 | Anderson et al. | |
| 2009/0132270 A1 | 5/2009 | Baptiste | |
| 2009/0164315 A1 | 6/2009 | Rothman | |
| 2009/0164323 A1* | 6/2009 | Byrne | 705/14 |
| 2009/0248494 A1 | 10/2009 | Hueter et al. | |
| 2009/0276522 A1 | 11/2009 | Seidel | |
| 2010/0023311 A1 | 1/2010 | Subrahmanian et al. | |
| 2011/0078232 A1 | 3/2011 | Van Den Driessche | |
| 2011/0184834 A1 | 7/2011 | Perrochon et al. | |

OTHER PUBLICATIONS

International Search Report and Written Opinion of International Application No. PCT/US2008/86960, mailed Apr. 7, 2009, 12 pages.

"GoShip.com Launches Service That Empowers Online Buyers to Choose Parcel Shipping Method and Allows Merchants to Cut Losses"; PR Newswire; (Apr. 3, 2000).

Office Action for U.S. Appl. No. 11/963,675, mailed Sep. 24, 2010, 18 pages.

Office Action for U.S. Appl. No. 11/963,675, mailed on Jun. 9, 2011, 20 pages.

Office Action for U.S. Appl. No. 11/963,675, mailed on Jun. 15, 2012, 18 pages.

Office Action for U.S. Appl. No. 11/963,382, mailed on Jun. 25, 2009, 13 pages.

Office Action for U.S. Appl. No. 11/963,382, mailed on Nov. 27, 2009, 13 pages.

Office Action for U.S. Appl. No. 11/963,382, mailed on Jun. 25, 2010, 18 pages.

Office Action for U.S. Appl. No. 11/963,382, mailed on Jan. 3, 2011, 13 pages.

Office Action for U.S. Appl. No. 11/963,382, mailed on Mar. 28, 2012, 20 pages.

Notice of Allowance for U.S. Appl. No. 11/963,382, mailed on Oct. 29, 2012, 15 pages.

Notice of Allowance for U.S. Appl. No. 11/963,382, mailed on Jan. 24, 2013, 17 pages.

Office Action for U.S. Appl. No. 11/963,711, mailed on Jan. 25, 2011, 15 pages.

Office Action for U.S. Appl. No. 11/963,711, mailed on Oct. 27, 2011, 21 pages.

Notice of Allowance for U.S. Appl. No. 11/963,711, mailed on Apr. 17, 2012, 15 pages.

Office Action for U.S. Appl. No. 11/963,718, mailed on Apr. 6, 2011, 25 pages.

Office Action for U.S. Appl. No. 11/963,718, mailed on Oct. 19, 2011, 21 pages.

Office Action for U.S. Appl. No. 11/963,470, mailed on Aug. 18, 2010, 21 pages.

Office Action for U.S. Appl. No. 11/963,470, mailed on May 12, 2011, 25 pages.

Office Action for U.S. Appl. No. 11/963,470, mailed on Aug. 1, 2012, 26 pages.

Office Action for U.S. Appl. No. 11/963,592, mailed on Feb. 2, 2010, 19 pages.

Notice of Allowance for U.S. Appl. No. 11/963,592, mailed on Sep. 16, 2010, 11 pages.

Office Action for U.S. Appl. No. 11/963,601, mailed on Sep. 14, 2010, 13 pages.

Notice of Allowance for U.S. Appl. No. 11/963,601, mailed on Dec. 17, 2010, 8 pages.

Office Action for U.S. Appl. No. 12/906,013, mailed on Jul. 12, 2012, 14 pages.

Office Action for U.S. Appl. No. 13/164,385, mailed on Nov. 29, 2012, 18 pages.

Smith, Michael D., "The Impact of Shopbots on Electronic Markets", Journal of the Academy of Marketing Science, vol. 30, No. 4, Fall 2002, pp. 446-454.

* cited by examiner

SOFTWARE SYSTEM FOR DECENTRALIZING ECOMMERCE WITH SINGLE PAGE BUY

CROSS-REFERENCES TO RELATED APPLICATIONS

This application is a Divisional application of U.S. patent application Ser. No. 11/963,711, filed Dec. 21, 2007, and entitled "Software System for Decentralizing Ecommerce with Single Page Buy". Related applications are U.S. patent application Ser. No. 11/963,675, entitled "Virtual Shelf with Single Product Choice and Automatic Multiple Vendor Selection"; U.S. patent application Ser. No. 11/963,382, entitled "System and Method for Dynamic Product Pricing"; U.S. patent application Ser. No. 11/963,718, entitled "3D Product Display on Internet with Content or Transaction Data on Back of Image"; U.S. patent application Ser. No. 11/963,470, entitled "Product Distribution System and Method Thereof"; U.S. patent application Ser. No. 11/963,592, now U.S. Pat. No. 7,831,584 B2, entitled "System and Method for Providing Real-Time Search Results on Merchandise"; and U.S. patent application Ser. No. 11/963,601, now U.S. Pat. No. 7,899,716 B2, entitled "System and Method for Integrated Payment and Shipping Information"; all filed Dec. 21, 2007.

BACKGROUND OF THE INVENTION

The present invention relates to selling products on the Internet, and in particular to simplifying the user purchasing experience.

Most websites follow a model popularized by Amazon. com and others. The user first selects the product on a product webpage, then must navigate through the checkout pages on separate webpages.

Currently the Internet experience mirrors the physical. In the brick and mortar world, a user walks from storefront to storefront to buy goods. On the Internet, a user navigates from website to website. Some websites are like shopping malls, with users able to go to one site, but then navigating from page to page. When advertising is done on other websites, the user can click on the ad to navigate to the storefront website selling the advertised goods. Once the user is at the storefront, the user first selects the product, then must navigate through the checkout pages.

Ads take many forms on the internet. Typically, a "banner ad" is a rectangular graphic element on a webpage has the artwork and product description, with a hyperlink. If the user clicks on the ad, the user is taken to the website offering the product or service. There are also pop-up ads, ads that incorporate video, pop-under ads and floating ads. These ads typically describe one product or service, or a class of products or services.

With respect to providing information to users, this takes many forms. In addition to webpages, ticker-type information can be provided which scrolls across the bottom of the screen, such as a stock ticker. RSS feeds can provide customized content, such as news subjects the viewer is interested in, pushed to a webpage for viewing.

US Patent Application Publication No. 20030020758 describes providing dynamically alterable banner ads. The ads can scroll either horizontally or vertically.

Unicast Communications Corporation U.S. Pat. No. 7,155,663 describes a number of prior art techniques for providing ads in webpages. A banner ad is generally produced by embedding HTML code for that banner within the HTML coding for a given web page. Consumers can obtain more information by clicking through the ad, thus being referred to the advertiser's site, and click through counts can be monitored. Interstitial ads are displayed in an interval of time that occurs after a user has clicked on a hot-link displayed by a browser to retrieve a desired web page but before that browser has started rendering that page. Ads can also be provided via a "push" application program that connects with a server, typically during off-hours. Ads are downloaded for later display. A user profile is used to determine the type of ads for that user. Real-time downloading and rendering of advertising HTML files uses advertising files stored on remote web servers. These ads show content in a "streamed" media file that relies on a continuous real-time network connection existing to a remote web server.

The '663 patent goes on to describe decoupling referring web page content from its corresponding advertising content, allowing an advertiser to easily update ads. Multi-threaded pipelining is used, processing each ad as a different thread.

US Patent Application Publication No. 20070083440 describes electronic advertising that enables a consumer to purchase advertised products while remaining connected to a hosting web site. The banner ads contain links that are activated to send a request to the banner applet for additional product information, or for an order form to allow the consumer to purchase the advertised product. The banner applet supplies on-demand information to the consumer workstations without causing the workstations to query the hosting server, or to terminate or suspend their active sessions with the sessions manager.

BRIEF SUMMARY OF THE INVENTION

The present invention provides software system with a "single-page buy" capability—both product information and purchase information on a single webpage, eliminating the need to go to a separate checkout page. The software does the backend work needed to display both, in order to simplify the user experience. A database includes data on (1) products, including dimensions and weight, (2) sellers, including location, and the user (buyer), including the buyer location and credit card information. For example, when the user first navigates to the page, the software already has all the data needed to calculate shipping price (knowing the product weight, dimensions, and in some cases where it is to be shipped from and to), allowing a total number to be displayed on the page. The removal of the need for additional information to be displayed and collected allows the purchase function (checkout) to fit on the same page as the product information.

In one embodiment, commerce is "atomized" by pushing out the capability to purchase throughout the Internet, not just on a company's website. The capability can be pushed out with ads on 3rd party sites, widgets on social networking sites, references in blogs, articles, etc. For example, an ad on a 3rd party website contains the information needed to make a purchase, without necessarily having to leave the 3rd party website. As used herein, an "ad" can be anything which references a product or service, such as images, text, a widget, etc. When a user clicks on the ad (or beforehand), the single-page buy (described above) is displayed. The code for this can actually be on the webpage where the ad is displayed, or a channel is opened to the a seller server. The "ad" may know who the user is, with all the user's credit card and shipping address data, if the user had previously registered with the site/system. Thus, all this information is filled in automatically. Alternately, the user can sign up on a 3rd party site within a widget. Similarly, a reference to the product (book name, CD title, etc.), can act as an ad in a blog, article, etc., such that when a user clicks on it, the single-page buy window appears.

In one embodiment, a gliding product display is provided. The ad has a banner-type ad dimension, with product icons scrolling or gliding across it. The multiple products can be from different sellers. Graphics for different products glide or slide across an area, which may be a traditional banner ad area. This is done not only on the system website, but in banner ad areas on 3rd party sites. Combined with the single-page buy feature (described above), this allows multiple products purchasing to be pushed out all over the web so buyers can purchases items wherever they are without having to go to a centralized destination site. The display may be a subset or category of products based on a user's preferences, publisher's preferences, or system discretion or algorithmic determination. Registered users are detected when they enter a website, and their data is retrieved to allow displaying product information deemed most applicable to that user. Alternately, or in addition, the ad could have check boxes or a drop-down list to allow the user to select a category of products to be displayed.

In addition to traditional ads, subscribing websites can have links to such a single-page buy. For example, a blog site can have software or use a webservice that recognizes when the name of a product offered by the system or any seller on the system is typed (such as in a review or comment on the product). The product name is automatically hyperlinked in the blog to the seller single page buy.

DETAILED DESCRIPTION OF THE INVENTION

Single-Page Buy Window

Figure 1:
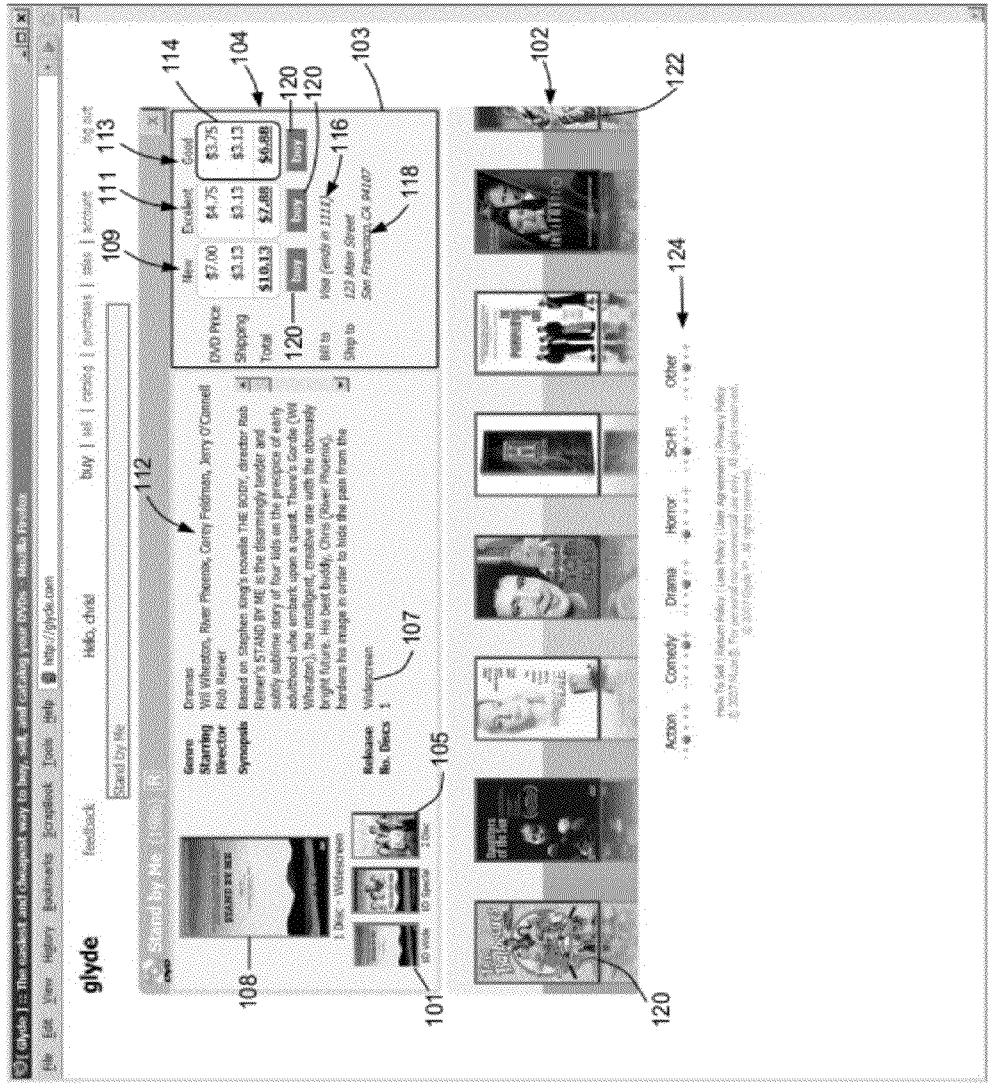
FIG. 1 is a diagram illustrating a single page buy window according to an embodiment of the invention.

FIG. 1 illustrates one embodiment of a display according to an embodiment of the invention. A window 102 shows artwork for multiple products which glide across in a stream. A second, expanded, single-page buy window 104 shows more information on a selected product which has been clicked on. Alternately, instead of a window 102 with multiple products, a single static ad could be clicked on to bring up window 104, or even just text with the product name in an article, blog, etc. Alternately, just the buy box 103 from window 104 could be displayed, or just a pricing information box 114 plus a buy button 120, or any other combination allowing a buy to be accomplished. In one example, the buy window can be just the cover art, with the price, condition and buy button above, below or on the cover art. Alternately, any other combination of information may be provided to give a small footprint buy window.

Window 104 includes artwork 108 and product description 112, including a version 107. Window 104 can show one product, or a number of versions or conditions of product. The example of FIG. 1 shows 3 products, which can all be offered by the same seller, or 2 or all 3 could be from different sellers. The user thus has the option of buying a new DVD 109 (or book or other product), a used DVD in excellent condition 111, or a used DVD in good condition 113. Other conditions could be used as well, such as acceptable condition. In addition to condition, other parameters could be used, such as disc-only sales, where a bare disk without the package is sent, instead of a packaged disc. Thus, a single seller is selected for each stock keeping unit (SKU) and each condition category for that SKU. For purposes of simplicity and quality of the user experience, poor products are not displayed. Alternate embodiments may provide more options for the user, such as more degrees of condition, or different ranges of prices or different seller reliability ratings.

Each product is listed with price information 114, which includes item cost, shipping cost and total cost. The price information includes the shipping costs. The shipping cost is calculated based on the dimensions and weight of the product, the address of the seller, and the address of the buyer. Because both seller and buyer information is stored, it is available at the time the user clicks on the product, and the calculation is run before window 104 is displayed. If the windows are on the system server, a local database can be used. If the windows are an ad on a 3rd party database, the information is pushed or fetched over the Internet to the window.

In one embodiment, the product is offered by multiple sellers. The price information is calculated by first selecting the appropriate seller using a number of factors, including item price, seller reliability rating, and shipping price and speed from the seller location. The price 114 reflects the selection of the appropriate seller. In one embodiment, an actual seller is not picked until a buyer makes a buy decision. The software merely determines that there are one or more sellers who can supply the product at the price and shipping costs displayed.

Additionally, since the buyer information is available, the buyer preferred payment information 116 is displayed, in this instance the last digits of a credit card. Also, the buyer's preferred shipping address 118 is displayed for the buyer to see. The buyer is identified from a cookie on the buyer's computer. Thus, no matter on what website the buyer is browsing, the buyer information is readily available. If the buyer agrees, the buyer can initiate what is truly a single-click, or a single-page, buy. This is done by clicking on buy button 120. If the buyer instead wants to select a different payment mechanism or shipping address, the buyer can click on payment information 116 or address 118 to bring up other options the buyer has previously entered, and a form for entering new data. If the buyer enters a different shipping address, the shipping costs and/or seller selection may be re-calculated.

The buyer can indicate interest in an ad by clicking on it, moving a cursor over it, having eye gaze at the ad detected, etc. The user can click on an image, words describing a product, a buy button on an ad, etc.

Current Information Pipeline

In one embodiment, the time-sensitive data (such as price and product availability) in the window is updated using Comet software program or similar technology. Comet enables web servers to send data to the browser without the need by the browser to continually request it. It allows creation of event-driven web applications, enabling real-time interaction in a browser. An open connection is established with the browser to update the web window in real time. For a gliding ad display 102, the various ads are pushed to the browser. When a buyer clicks on one, part or all of the additional information in window 104 is pushed to the browser.

This information is designed so that it rarely needs to be updated, minimizing the bandwidth needed. For example, the cover art, description, version, buy buttons, etc. should be stable, almost never changing. The price is calculated for the buyer before it is displayed, so it also would rarely change, unless the market price changes while the window is open. Since the market price is designed to be stable, this should also rarely occur (see co-owned U.S. application Ser. No. 11/963,382, filed Dec. 21, 2007, entitled "System and Method for Dynamic Product Pricing", the disclosure of which is hereby incorporated herein by reference.

System

Figure 2:
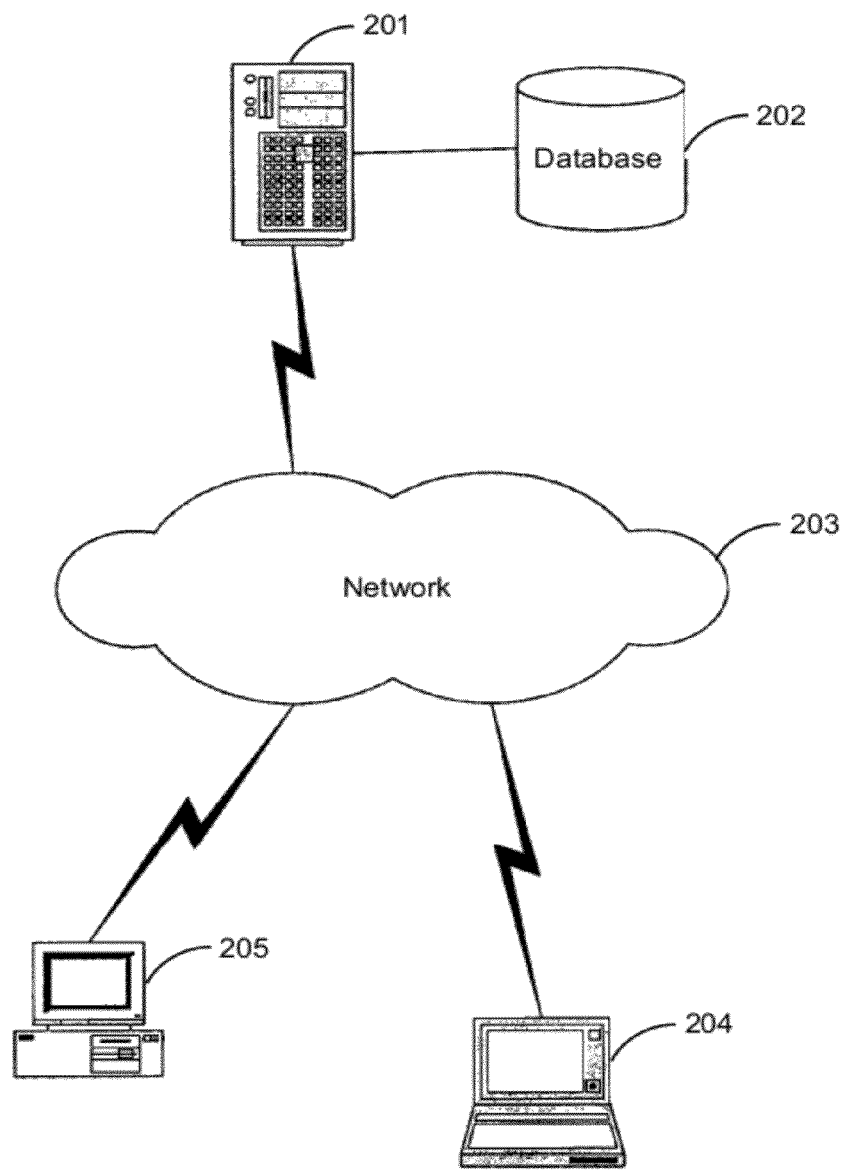
FIG. 2 is a diagram of an overall system supporting the present invention.

FIG. 2 illustrates a system supporting the present invention. A server 201 hosting the multi-seller website is connected to a network 203 (e.g., the Internet). Also connected to the Internet is a 3rd party seller 204 which may display ads for products on the multi-seller website. Finally, a user computer 205 is shown connected to the Internet, for browsing either the multi-seller or 3rd party website.

The server 201 is configured to provide the window 104 with a display of products, and react to user actions. The server 201 may be implemented using multiple computing devices. A database 202 stores data on both sellers and users. In one embodiment, database 202 is directly connected to server 201. In another embodiment, database 202 includes multiple storage devices that are accessible over network 203 or another network.

Atomizing of Commerce

Figure 3:
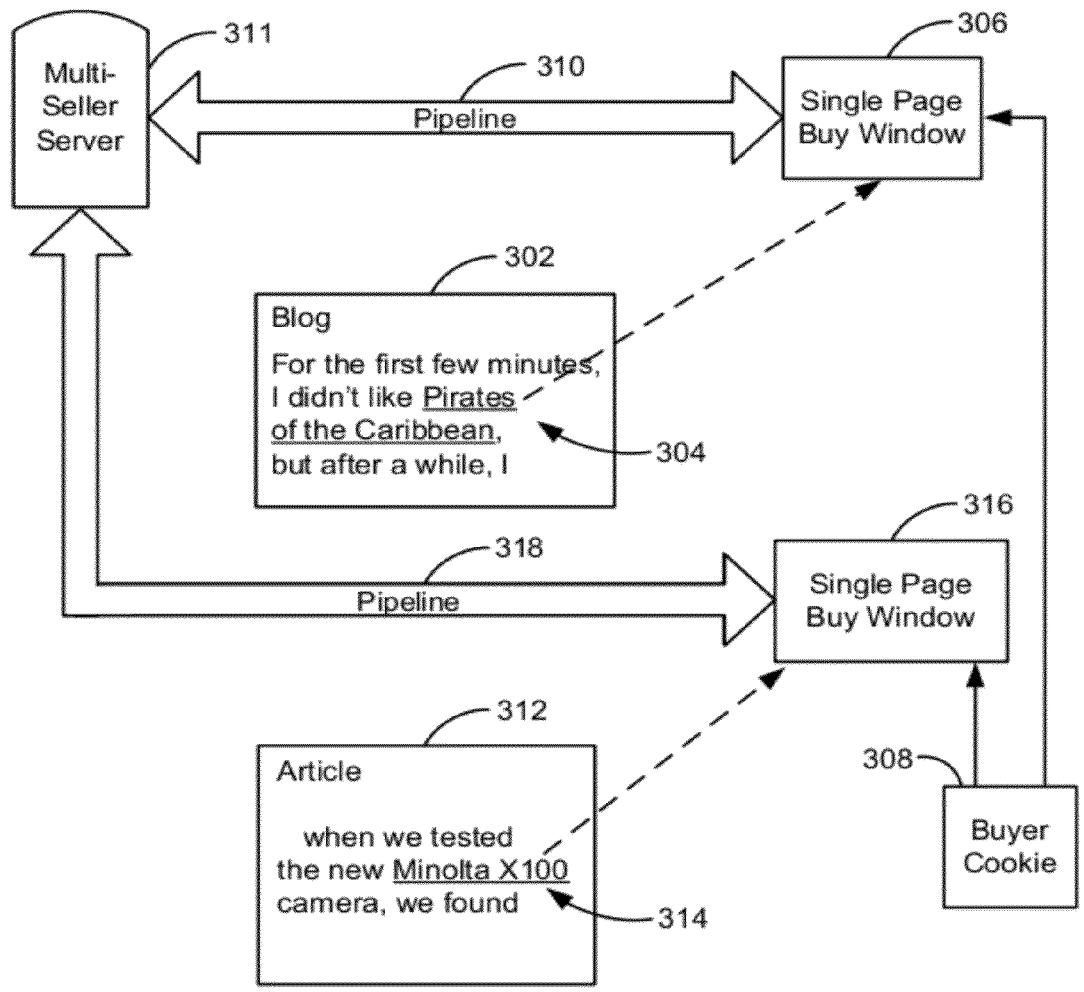
FIG. 3 is a diagram illustrating the atomization of commerce according to one embodiment of the present invention.

FIG. 3 illustrates one embodiment of how commerce can be atomized Not only are ads (in particular, widgets) pushed out everywhere on the Internet, but the user experience is one of all or most of the buy capability being in the widget itself. FIG. 3 shows an example of a blog 302 mentioning a movie 304 available on DVD. The blog author will have subscribed to the multi-seller website, downloaded software or embedded a code snippet. As part of that process, software is provided to the blogger that compares what the blogger writes to product descriptions at the multi-seller website. If there is a match, the words are hyperlinked. After hyperlinking, if a reader clicks (or mouses over) the hyperlink, a single page buy window 306 is generated, as described above with respect to FIG. 1. The information for identifying the buyer for the single-page buy window comes from a cookie 308 on the reader's computer, and a pipeline 310 opened by the Comet application to retrieve the product information including current market price from the multi-seller server 311.

The buyer is identified by the cookie which is sent to the multi-seller server. From identifying the buyer, the multi-seller server looks up the buyer's address, which can be used to determine the best market price (by determining the best seller from the item price, seller reliability, and shipping costs and time from the seller location). That information is used to generate the single-page buy window. If the user clicks the buy button on the single-page buy window, the purchase is made and a receipt is displayed to the buyer, as well as an email receipt being sent to the buyer's registered address. Thus, from the user's perspective, it appears as if the blog site handles the purchase. Note that this works only if both the blogger and the buyer are registered. If the blogger doesn't register, the text isn't highlighted. If the user isn't registered, when the user clicks, the single page buy page may prompt the user to enter a zip code or other aspects of an address, or sign in or log in. With or without that information, the best market price can be determined and displayed. If the new buyer clicks "buy," the user will be directed to enter a credit card or other payment information, as well as completing the full address information, if that hasn't already been done. The buy is then completed as for a true single-page buy. A cookie is placed on the user computer, and the user is registered, with the payment and shipping address information being stored at the multi-seller server. If desired, the user could instead opt-out of registration.

Window 310 of FIG. 3 is another example of the atomization of commerce. The buy trigger is pushed out into an article 312, which is a review of a product 314. Again, the review website with article 312 first registers, and product descriptions matching those on the multi-seller website are hyperlinked. When the potential buyer clicks, a single page buy window 316 pops up, pulling information from cookie 308 and a pipeline 318 to the Multi-Seller Server 311 opened by a Comet application, as described above. As can be seen, anything could be hyperlinked—a traditional ad, a word description, an image, etc. The ads could be hyperlinked text or images on a person's MySpace or Facebook or other social networking page, or in an email. In another example, a blog 302 includes a product reference 304 (Pirates of the Caribbean). When a user clicks on reference 304, a single page buy window 306 pops up. Window 306 pulls information from cookie 308 and a pipeline 310 to the Multi-Seller Server 311.

In one embodiment, a buyer ad display is provided. The ad display is associated with the buyer, not with the multi-seller website or 3rd party websites the buyer visits. A gliding display 102 can be placed by the buyer on his/her desktop, phone, etc. The user can download a plug-in application for the user's browser to do this function. The gliding display will appear as the buyer browses around the Internet. Any other ad described herein can also be used. The display or widget can be in a toolbar, in a window at the bottom of the display, or in any other location on the desktop. The application for producing the ad or widget can be a client added to a desktop or a plug-in for a browser, or any other local application. Alternately, a link to activate a remote application can be downloaded. Words can also be highlighted as in the blog example described above, for either online or offline content. For example, documents the user has locally saved, or even as they are being typed, can have keywords linked to an ad. When the buy pulls up material on the web, such as an article, the ad software can highlight items in the article and link them to ads. The user may receive an incentive for accepting such software, such as a discount on items bought.

Gliding Display

FIG. 1 illustrates a gliding display 102 according to an embodiment of the invention. As a product image 120 moves off the display to the left, a new product image 122 appears from the right. The product images move, or glide, in a scrolling movement across the display window 102. This display window can be placed in a banner ad area on any website or as a widget anywhere on a 3rd party site. The information is provided and updated in real time using Comet or a similar technology. The scrolling movement is similar to a ticker-tape. By using such a scrolling motion, multiple products can be displayed in an area typically used for a single product ad. Thus, multi-product, multi-seller information can be easily distributed throughout the internet on 3rd party sites. In addition, this format can be used for the multi-seller site itself, with multiple gliding windows being displayed on a page.

In one embodiment, the type of product information displayed can be controlled by the user if desired. Alternately, it can be controlled by the publisher's preferences, or multi-seller website system discretion or algorithmic determination. For example, if DVDs are being displayed, as illustrated, the user can click on one of buttons 124 to select a genre of movies. Alternately, or in addition, the user could select other classes of products to be displayed, or a random mix of different products. For a registered user, the multi-vendor website will have historical data on that user stored in a database. That information is used to generate personalized product ads that are most likely to appeal to that particular user. Thus, any where that user goes on the Internet (anytime the user's browser is opened), specialized ads will be displayed at any site also registered. In alternate embodiments, variations may be used. For example, the ads could flip over or be replaced to reveal the new ads, instead of scrolling. A single or double click could cause the ad to flip over, revealing more information, with the changing of ads being paused for a period of time.

Widget

In one embodiment, a widget can be used to display images of products. Widgets are downloadable interactive virtual tools. They can be loaded into social networking pages, such as MySpace or Facebook, or could be put on retailer or other sites. Typical uses of widgets include showing the user the latest news, the current weather, a dictionary, a map program, etc.

Figure 4:
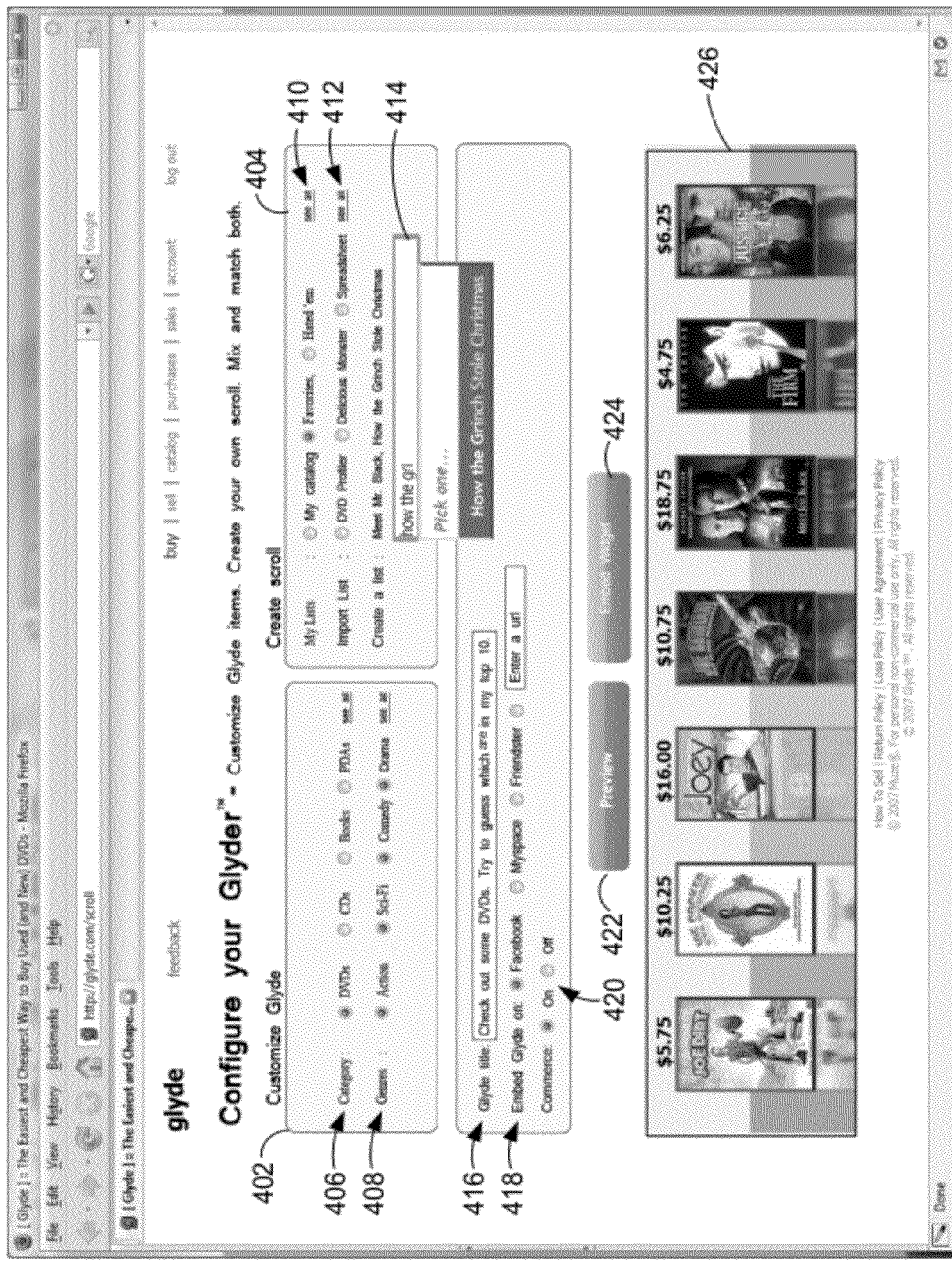
FIG. 4 is a diagram of a user interface for configuring a widget according to an embodiment of the invention.

FIG. 4 is a diagram of a user interface for configuring a widget according to an embodiment of the invention. A box 402 shows how the gliding display described above can be imported as a widget, configured as the user desires. For example, the user can select a category 406 and a genre 408.

Alternately, the user can use box 404 to create a scrolling display of a list of that user. The user can select an existing user list 410, import a list 412, or create a list 414. The software of the multi-user site will access the list, compare it to items in its database, and generate a scrolling display of just those products.

The user can also customize the title 416 that will appear on the widget, such as "Check out these CDs. Guess which are in my top 10." The user is provided radio buttons 418 to select one or more locations to download the widget to. An option to turn on or off the glide function is provided by buttons 420. The user can preview the widget with button 422, and if satisfied, can export and download it with button 424. In one embodiment, a scrolling window 426 is shown, and is configured on the fly as the user makes the selections, giving an instant preview.

Figure 5:
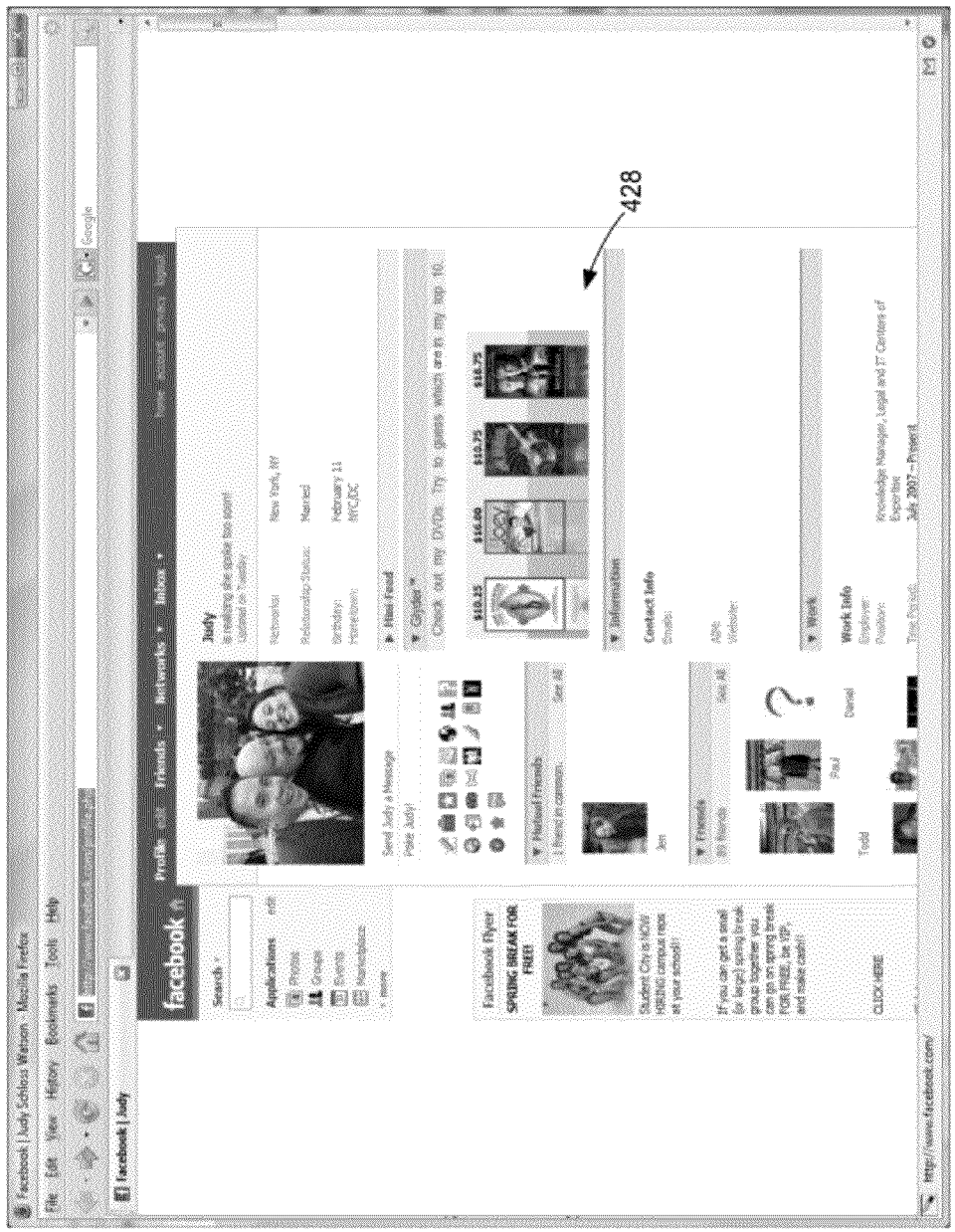
FIG. 5 is a diagram of an example of a widget with product images on a Facebook page according to an embodiment of the invention.

FIG. 5 is a diagram of an embodiment of a users Facebook page showing the widget 428 having been imported. The user can click on a portion of the widget display, such as the title, to bring up the configuration screen of FIG. 4 to modify the widget display or turn it on or off.

It is to be understood that the examples and embodiments described above are for illustrative purposes only and that various modifications or changes in light thereof will be suggested to persons skilled in the art and are to be included within the spirit and purview of this application and scope of the appended claims. For example, the scrolling of gliding ads could be left to right, or vertical, or spiral shaped. A non-open connection could be used, with static ads that are periodically replaced, but still using the single-page buy with its open connection when clicked on. The ads could be placed in video games, such as an image of a DVD on a shelf in a virtual room being linked to a single page buy when clicked. For another example, the products can be DVDs, CDs, video games, books, consumer electronics (i.e., PDAs, cell phones, etc.), jewelry, toys, software or any other product or service. The product or service can be bought, bartered for or rented. The embodiments can be applied to single or multi-vendor websites, and the vendors can be individuals, large corporations, small businesses, charities or any other organization. As used in the claims, the term "products" includes services. Therefore, the above description should not be understood as limiting the scope of the invention as defined by the claims.

What is claimed is:

1. A method comprising:
storing data in a database on a plurality of products for purchase or sale in a multi-buyer, multi-seller environment, the database being coupled to a multi-seller server that facilitates the purchase and sale of products in the multi-buyer, multi-seller environment;
storing data in the database on a plurality of buyers and sellers in the multi-buyer, multi-seller environment including shipping data and payment information; and
the multi-seller server causing product data on a subset of said products for purchase or sale by at least one of said plurality of sellers to be displayed in a display window of a computing device separate from the multi-seller server and associated with one of the plurality of buyers, the product data being displayed via a third party website that is separate from the multi-seller server;
wherein the multi-seller server causing product data to be displayed includes causing, via the third party website, at least one of said products for purchase or sale in the subset of products to be repeatedly replaced and an alternate product of the products for purchase or sale in the subset to be displayed such that a stream of products for sale or purchase is displayed in the display window of the computing device via the third party website, wherein causing at least one of said products to be repeatedly replaced and an alternate product to be displayed includes scrolling the displayed product data in a horizontal fashion such that as the at least one product moves off of one side of the display window the alternate product appears from the opposite side of the display window; and
wherein the product data includes a product image and a corresponding product price, the product price for each displayed product including a shipping cost calculated based on the shipping data of the buyer associated with the computing device and the shipping data of the seller of the displayed product, and wherein causing at least one of said products to be repeatedly replaced and an alternate product to be displayed includes scrolling product images and their corresponding product prices in a horizontal fashion such that as one product image and its corresponding product price moves off of one side of the display window another product image and its corresponding product price appears from the opposite side of the display window.

2. The method of claim 1 wherein said replacing is done within a time period of less than five seconds.

3. The method of claim 1 further comprising:
collecting data on product preferences of said buyer associated with said computing device;
detecting said buyer associated with said computing device; and
selecting the subset of products to display to the buyer associated with said computing device in accordance with said product preferences.

4. The method of claim 1 further comprising:
in response to an action by the buyer associated with the computing device indicating interest in one of said displayed products, causing a single page buy display window to be displayed to said buyer, said single page buy display window including (a) an image of said product the buyer indicated interest in, (b) a description of said product the buyer indicated interest in, (c) a cost of said product the buyer indicated interest in, said cost including a cost of shipping the product from a seller of the product to the buyer; and (d) a buy button.

5. The method of claim 1, wherein the third party website is a social networking website such that the product data on the subset of said products is displayed to the buyer associated with the computing device via the social networking website.

6. The method of claim 1, wherein the product data for the subset of said products is displayed in an ad banner such that the product images and the corresponding product prices of the subset of products are repeatedly replaced within the ad banner.

7. The method of claim 1, wherein the products are offered for sale by different sellers.

8. The method of claim 1, wherein the subset is selected based on one or more of:
a preference of the buyer associated with the computing device;
a selection by the buyer associated with the computing device;
a publisher's preferences;
system discretion; and
algorithmic determination.

9. The method of claim 1, wherein the product data including the product images and the corresponding product prices for the subset of products is pushed to the computing device in real time.

10. The method of claim 1 further comprising:
receiving, at the multi-seller server and from a widget user, widget customization information for customizing a widget that causes the product data on the subset of said products to be displayed in the display window via the third party website, wherein the server causes the at least one product and the alternate product to be displayed in the display window via the widget;
generating the widget in accordance with the customization information; and
communicating the widget to an entity other than the multi-seller server.

11. The method of claim 10, wherein the widget customization information includes information identifying the type of products forming the subset of products.

12. The method of claim 10, wherein the entity other than the server is a social media website associated with the widget user.

13. The method of claim 10, wherein the entity other than the server is the widget user.

14. A computer-implemented system comprising:
a database configured to store data on a plurality of products for purchase or sale over the internet in a multi-buyer, multi-seller environment, and configured to store data on a plurality of buyers and sellers in the multi-buyer, multi-seller environment including shipping data and payment information;
a multi-seller server coupled to the database, the multi-seller server being configured to facilitate the purchase and sale of products in the multi-buyer, multi-seller environment, and being configured to provide product images and product prices using data from said database; and
a computer readable media including computer readable code comprising:
code for causing product data on a subset of said products for purchase or sale by at least one of said plurality of sellers to be displayed in a display window of a computing device separate from the multi-seller server and associated with one of the plurality of buyers, the product data being displayed via a third party website that is separate from the multi-seller server;
wherein the code for causing product data to be displayed includes code for causing, via the third party website, at least one of said products for purchase or sale in the subset of products to be repeatedly replaced and an alternate product of the products for purchase or sale in the subset to be displayed such that a stream of products for sale or purchase is displayed in the display window of the computing device via the third party website, wherein the code for causing at least one of said products to be repeatedly replaced and an alternate product to be displayed includes code for scrolling the displayed product data in a horizontal fashion such that as the at least one product moves off of one side of the display window the alternate product appears from the opposite side of the display window; and
wherein the product data includes a product image and a corresponding product price, the product price for each displayed product including a shipping cost calculated based on the shipping data of the buyer associated with the computing device and the shipping data of the seller of the displayed product, and wherein the code for causing at least one of said products to be repeatedly replaced and an alternate product to be displayed includes code for scrolling product images and their corresponding product prices in a horizontal fashion such that as one product image and its corresponding product price moves off of one side of the display window another product image and its corresponding product price appears from the opposite side of the display window.

15. The system of claim 14 wherein said code for repeatedly replacing includes code for repeatedly replacing within a time period of less than five seconds.

16. The system of claim 14 further comprising:
code for collecting data on product preferences of said buyer associated with said computing device;
code for detecting said buyer associated with said computing device; and
code for selecting the subset of products to display to the buyer associated with said computing device in accordance with said product preferences.

17. The system of claim 14, wherein the computer readable code further comprises:
code for causing, in response to an action by the buyer associated with the computing device indicating interest in one of said displayed products, a single page buy display window to be displayed to said buyer, said single page buy display window including (a) an image of said product the buyer indicated interest in, (b) a description of said product the buyer indicated interest in, (c) a cost of said product the buyer indicated interest in, said cost including a cost of shipping the product from a seller of the product to the buyer; and (d) a buy button.

18. The system of claim 14 further comprising:
code for configuring a widget for displaying said product data.

19. The system of claim 14 wherein the product data for the subset of said products is displayed in an ad banner such that the product images and the corresponding product prices of the subset of products are repeatedly replaced within the ad banner.

20. The system of claim 14 wherein the third party website is a social networking website such that the product data on the subset of said products is displayed to the buyer associated with the computing device via the social networking website.

* * * * *